Aug. 25, 1959   F. KURATA ET AL   2,900,797
SEPARATION OF NORMALLY GASEOUS ACIDIC COMPONENTS AND METHANE
Filed May 25, 1956   3 Sheets-Sheet 1

INVENTORS
JAMES PAUL KOHN
FRED KURATA
BY
Cruzan Alexander
ATTORNEY

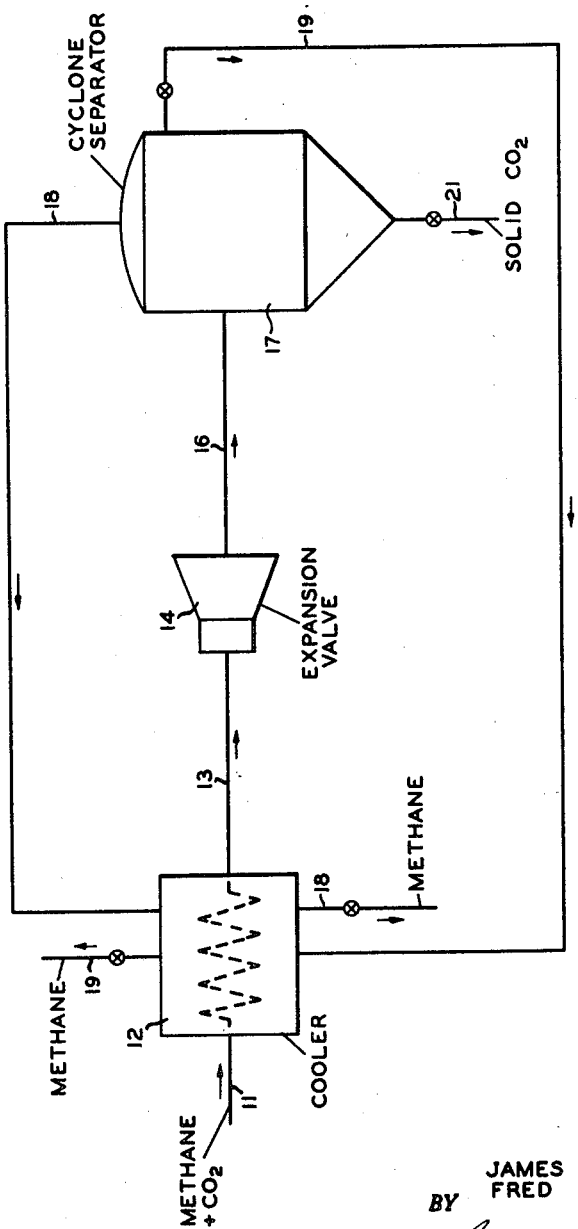

United States Patent Office 2,900,797
Patented Aug. 25, 1959

2,900,797

SEPARATION OF NORMALLY GASEOUS ACIDIC COMPONENTS AND METHANE

Fred Kurata, Lawrence, Kans., and James Paul Kohn, South Bend, Ind.

Application May 25, 1956, Serial No. 587,401

6 Claims. (Cl. 62—12)

This invention relates to the separation of normally gaseous acidic components and normally gaseous hydrocarbons. In one aspect this invention relates to the purification of a methane stream containing carbon dioxide. In another aspect this invention relates to the removal of carbon dioxide from natural gas.

Various normally gaseous hydrocarbon streams that contain methane as the major component also contain normally acidic components, such as carbon dioxide, in amounts which require the separation of such normally gaseous acidic components from the gas stream. Present methods for removal of these acidic components are inadequate and impractical in many instances where substantially pure streams are desirable. Carbon dioxide my be removed, for example, by various conventional absorption methods using an amine solution or an alkali hydroxide. Water-washing also may be used for removing carbon dioxide.

It is desirable to remove carbon dioxide from methane because the presence of these acidic components reduces the fuel value of the methane stream and also results in corrosion of the treating equipment or handling equipment when small amounts of water are present.

Carbon dioxide may be present in the natural gas stream as supplied from the well or may be present as the result of various treatments prior to the desired separation of the carbon dioxide from the methane stream.

Processes now used for separation of acidic components from normally gaseous hydrocarbons require relatively complicated equipment and the use of relatively expensive reactants or reagents. It is much to be desired to provide a process for the removal or recovery of acidic components, such as carbon dioxide, from methane containing gases by a simpler, less expensive process.

The object of this invention is to provide a method for purification of a normally gaseous hydrocarbon stream containing normally gaseous acidic components.

Another object of this invention is to provide a new and useful method for removal of carbon dioxide from natural gas.

It is still another object of this invention to provide a more economical and inexpensive process for the removal of carbon dioxide from methane by utilizing the high pressure available from natural gas from the well.

Still another object of this invention is to separate small amounts (1 mole percent or more) of carbon dioxide or other normally gaseous acidic components from methane.

Various other objects and advantages of the present invention will become apparent to those skilled in the art from the accompanying description and disclosure.

According to this invention, a mixture of methane and carbon dioxide is cooled, while maintaining the pressure sufficiently high, sufficient to precipitate solid carbon dioxide from a liquid phase of methane. The resulting liquid phase of methane contains less carbon dioxide than the original mixture and is, therefore, recovered as a product of the process by separating therefrom the solid carbon dioxide.

In one embodiment of this invention, a normally gaseous mixture containing methane as the principal component and carbon dioxide as an acidic impurity is cooled under elevated pressure. The cooled stream is then expanded to reduce the pressure such that finely divided solid carbon dioxide is formed in admixture with liquid methane. The resulting slurry of solid carbon dioxide and liquid methane with any gaseous methane which may be present as a result of the reduction in pressure are passed to a suitable separation zone where the solid carbon dioxide is separated from liquid and vaporous methane. Using the preferred operating conditions of the present invention, the stream of methane and carbon dioxide is cooled at a pressure above the three phase locus pressure and a temperature slightly above the three phase locus temperature as hereinafter described. This mixture is then expanded through an expansion valve, or an expansion engine, to reduce the pressure to about one atmosphere and the temperature to about −258° F. At this temperature and pressure there are a single liquid phase of methane, a vapor phase of methane, and a solid phase of carbon dioxide. Under these preferred conditions the carbon dioxide content in the liquid is about 0.2 mole percent. Any vapor present at these conditions will contain less than 0.2 mole percent carbon dioxide, usually only a trace.

Figure 1 of the drawings is a diagrammatic illustration of a pressure-temperature diagram for one particular mixture of methane and carbon dioxide.

Figure 5 is a diagrammatic view of the apparatus for carrying out the process.

Figure 1:
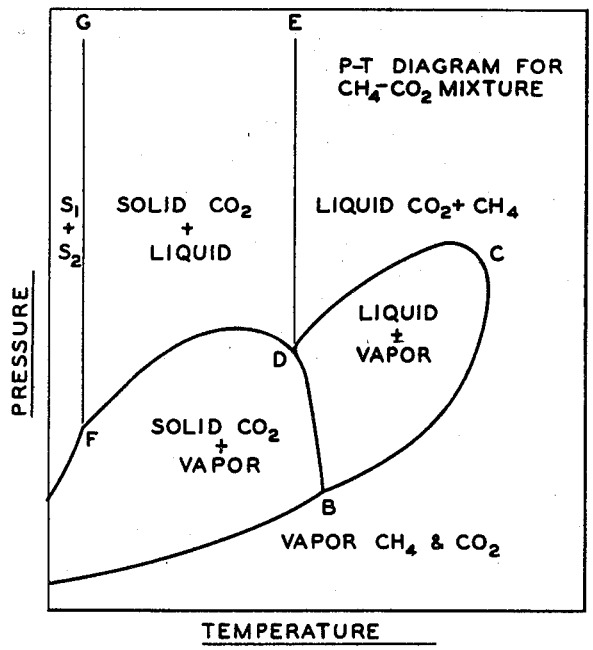

Curve BCD of Figure 1 is the typical loop for vapor-liquid equilibria; C being the critical point of the mixture. As can be seen from this figure the solid-vapor boundary is defined by the curve BDF. The solid-liquid boundaries are defined by the two vertical lines DE and FG. Therefore, on the curve BDF, the three phases are in equilibrium and in coexistence. In accordance with the present invention, the proper conditions of temperature and pressure are selected such that the region in which solid exists is avoided until after the mixture passes through the expansion valve. In other words, conditions are such that the mixture to be treated is always in the liquid and/or vapor phase up to the expansion valve. After the mixture is cooled in a cooler, it is desirable to have the mixture as a liquid in the region to the right of DE and above CD of Figure 1. It is advantageous to cool the mixture so that its temperature approaches curve DE from the right.

Figure 2:
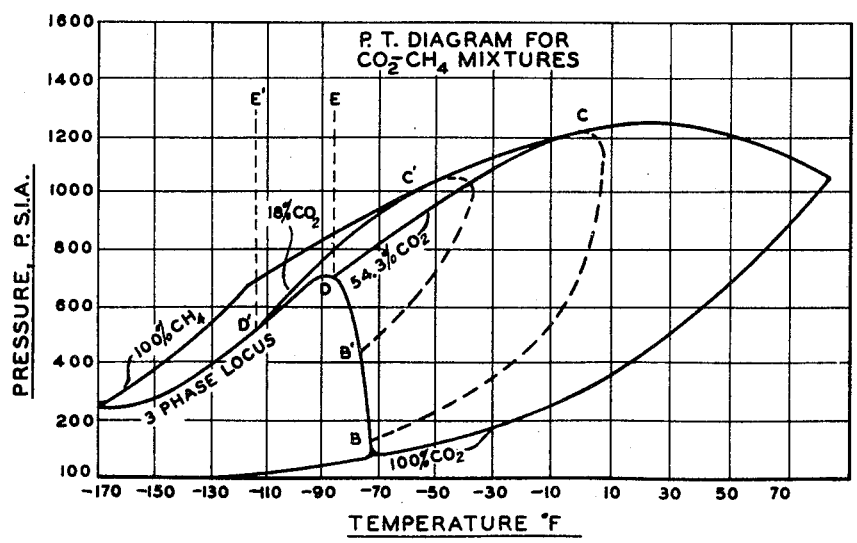
Figure 2 is a pressure-temperature diagram for two mixtures of methane and carbon and methane, for pure methane and for pure carbon dioxide.

The portion of the diagram from Figure 1 represented by BCDE for two mixtures of carbon dioxide and methane is represented on the plot of Figure 2. For a mixture containing 54.3 mole percent carbon dioxide the temperature must be higher than BDE in order to avoid the formation of solid. If this mixture is completely liquefied at the lowest possible temperature, it is seen that this mixture must be kept under a pressure higher than about 710 p.s.i.a. and the solid will begin to form at a temperature of about −85° F.

For the mixture containing 18 mole percent carbon dioxide, B′D′E′ is the boundary curve for solid. For this mixture the pressure must be maintained higher than 490 p.s.i.a. in order to completely liquefy it at the minimum temperature of about −117° F. The pressure and temperature where solid forms in the liquid becomes lower as the carbon dioxide content decreases. In a mixture containing about 0.2 mole percent carbon dioxide, the mxiture can be completely liquefied under atmospheric pressure at −258° F. without the formation of solid. This means that the solubility of carbon dioxide in liquid methane is about 0.2 mole percent under these conditions.

In our process we propose to maintain the pressure higher than point D of Figure 1 or Figure 2 and cool to near the temperature DE to completely liquefy the mixture without the formation of solid. The liquid is then expanded through an expansion valve to precipitate out the solid carbon dioxide. For this reason the pressure and temperature under which the mixture is liquefied depends upon its carbon dioxide content. Our own data show that point D for a mixture containing 8.5 mole percent carbon dioxide is about 450 p.s.i.a. and −128° F. This point for a mixture containing 3 mole percent carbon dioxide is 300 p.s.i.a. and −159° F., and for a mixture containing about 0.2 mole percent carbon dioxide is 1 atmosphere absolute and −258° F.

Figure 3:
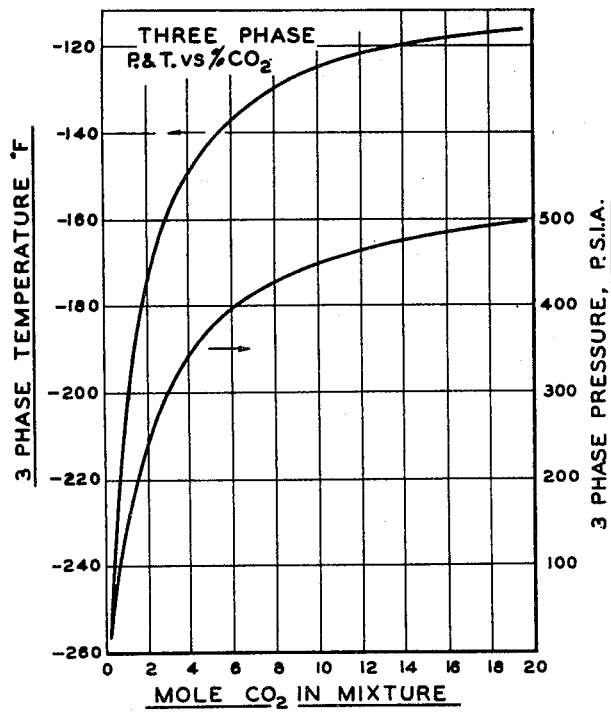
Figure 3 is a plot of the three phase locus temperature and the three phase locus pressure against mole percent carbon dioxide in the mixture of methane and carbon dioxide.
Figure 4:
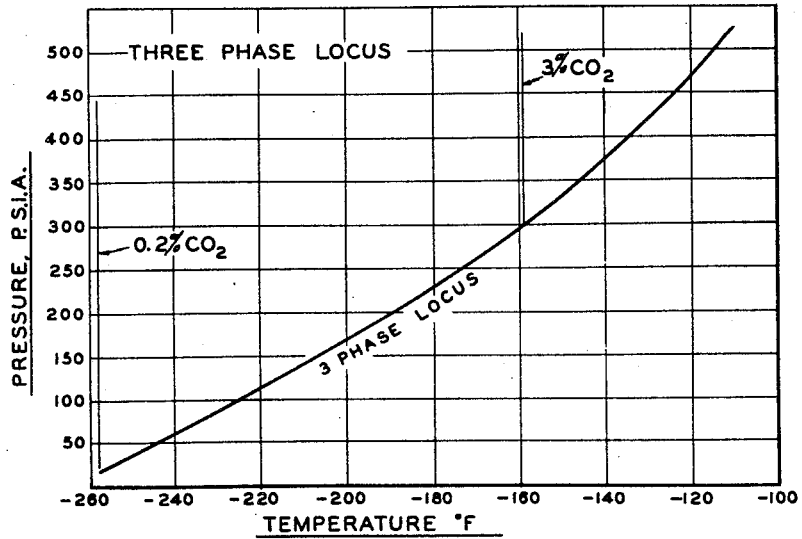
Figure 4 is a plot of the three phase locus of Figure 2 down to one atmospheric pressure absolute.

Figure 3 is the plot of three phase temperature and pressure vs. mole percent carbon dioxide. Figure 4 is the three phase locus down to 1 atmospheric pressure absolute. The three phase locus shown in Figures 3 and 4 will determine the minimum temperature and pressure at which any particular mixture can be liquefied without the formation of solid carbon dioxide.

Since natural gas contains certain impurities, such as ethane, hydrogen sulfide, and nitrogen, the presence of these impurities will alter the above limits of temperature and pressure to some extent. In the initial step of cooling the normally gaseous methane containing stream, the pressure should be above the three phase locus pressure while employing a sufficiently low temperature to cool the methane containing stream without the formation of solid. The pressure, however, can be lowered with the temperature as the carbon dioxide content decreases along the three-phase locus. Upon liquefaction of the methane, only a single phase is formed with a two-component mixture of methane and carbon dioxide. However, it is to be recognized that if other impurities are present such as hydrogen sulfide, another liquid phase may be formed such as a liquid hydrogen sulfide rich phase.

Figure 5 of the accompanying drawings illustrates an arrangement of apparatus of the present invention using as a working example specific operating conditions for the continuous removal of carbon dioxide from natural gas in which the separation is effected in accordance with the conditions described. According to the drawing, natural gas containing about 5 mole percent carbon dioxide and which has been dehydrated by conventional means at a pressure of about 3,000 pounds per square inch absolute and at a temperature of about 100° F. or higher, is passed from the well or from a compressor through conduit 11 to a cooler 12. In cooler 12 the methane stream containing about 5 mole percent carbon dioxide is cooled to a temperature of about −140° F. by heat exchange with the purified methane product streams in conduits 18 and 19. Additional cooling by external refrigeration (not shown) may be necessary to achieve this temperature. At this temperature and pressure, a single phase containing methane and carbon dioxide exists. The pressure may be reduced in cooler 12 to lower the temperature to the desired value or to aid the cooling resulting from the heat exchange. The pressure, however, should be maintained sufficiently high in accordance with the temperature that the carbon dioxide does not separate as a solid from the liquid methane stream. The pressure is maintained above the three phase locus pressure, for example, 750 pounds per square inch absolute.

The liquid stream is passed from cooler 12 through conduit 13 to an expansion valve or an expansion engine 14. In expansion valve 14 the pressure is reduced to atmospheric and the temperature falls to about −258° F., the boiling point of methane. During the expansion and cooling in expansion valve 14, carbon dioxide freezes out as fine crystals and is carried over in the gas and liquid stream through conduit 16 to a conventional cyclone separator 17. In cyclone separator 17 solid carbon dioxide is removed or separated from methane as a slurry and is withdrawn from the cyclone separator through conduit 21. Liquid methane containing less than 0.2 mole percent carbon dioxide is removed from cyclone separator 17 through conduit 19 as a product of the process. This liquid methane stream may be heat exchanged with the incoming feed in cooler 12, as shown. After heat exchanging cooler 12, the methane stream may be further expanded, if its pressure is above atmospheric, and passed to storage as a liquid or it may be vaporized for use as fuel or other uses. When the methane in conduit 19 is to be stored or transported, it may not be desirable to heat exchange this stream in cooler 12. Vaporous methane is also withdrawn from cyclone separator 17 through conduit 18. This vaporous stream of methane may be heat exchanged with the incoming feed in cooler 12, as shown. The vaporous stream in conduit 18 may be combined with the liquid methane stream or may be disposed of from the process as fuel without departing from the scope of this invention.

It may be preferable to use two separators instead of a single one shown. In this case one separator will be emptied of solid carbon dioxide while the other one is on stream. Hot incoming methane gas can serve to vaporize the solid carbon dioxide in the separator. Timed switching valves can make this alternate operation of separators automatic.

If feed gas contains a large concentration of carbon dioxide, e.g., 15 or 20 mole percent carbon dioxide, it may be advantageous to fractionate the gas down to about 5 to 10 mole percent carbon dioxide, before using the described process to freeze out the residual carbon dioxide. Here it will be necessary to operate the fractionator above 715 pounds per square inch absolute in order to prevent the formation of solid carbon dioxide in the fractionation equipment.

Various alternations and modifications of the steps and the correlation of temperature and pressure conditions with specific compositions of gas will become apparent to those skilled in the art without departing from the scope of this invention.

We claim:

1. A process for the separation of carbon dioxide and methane which comprises maintaining a mixture of methane and carbon dioxide at a sufficiently high pressure and a sufficiently low temperature to completely liquefy methane in which all the carbon dioxide is dissolved, thereafter reducing the temperature on said liquid methane sufficiently low such that carbon dioxide precipitates from liquid methane as a solid, and separating solid carbon dioxide from methane.

2. A process for the separation of carbon dioxide and methane which comprises cooling a stream of methane containing carbon dioxide while maintaining a pressure such that the methane is completely liquefied and all of the carbon dioxide is dissolved in the liquefied methane, thereafter reducing the temperature of the completely liquefied methane sufficiently low such that finely divided solid carbon dioxide precipitates from liquid methane and separating finely divided solid carbon dioxide from methane.

3. A process for the separation of carbon dioxide and methane which comprises cooling a stream of methane containing carbon dioxide while maintaining a pressure such that the methane is completely liquefied and all of the carbon dioxide is dissolved in the liquefied methane, thereafter expanding the completely liquefied methane to lower the temperature thereof such that finely divided solid carbon dioxide precipitates from liquid methane and separating finely divided solid carbon dioxide from liquid methane.

4. A process for the separation of carbon dioxide and methane which comprises cooling a stream of methane containing between about 1 and about 20 mole percent carbon dioxide while maintaining a pressure such that the methane is completely liquefied and all of the carbon dioxide is dissolved in the liquefied methane, thereafter expanding the completely liquefied methane to reduce the pressure to about atmospheric and the temperature to about $-258°$ F. to precipitate solid carbon dioxide from liquid methane, and separating solid carbon dioxide from expanded methane.

5. A process for the separation of carbon dioxide and methane which comprises cooling a stream of methane containing about 5 mole percent carbon dioxide to a temperature of about $-140°$ F. while maintaining the pressure above 750 pounds per square inch absolute and sufficiently high to completely liquefy methane in which all of the carbon dioxide is dissolved, thereafter expanding the completely liquefied methane to about atmospheric pressure and to a temperature of about $-258°$ F. to form a slurry of liquid methane and finely divided solid carbon dioxide, passing said slurry to a cyclone separation zone, in said cyclone separation zone separating liquid methane containing not more than about 0.2 mole percent from finely divided solid carbon dioxide, and recovering the purified liquid methane as a product of the process.

6. A process for the separation of carbon dioxide and methane which comprises maintaining the mixture of methane and carbon dioxide at a sufficiently high pressure and a sufficiently low temperature to completely liquefy the methane in which all of the carbon dioxide is dissolved, thereafter expanding liquefied methane to reduce the temperature sufficiently low such that solid carbon dioxide is formed and separating the solid carbon dioxide thus formed from expanded methane.

References Cited in the file of this patent
UNITED STATES PATENTS

| | | |
|---|---|---|
| 668,197 | Le Sueur | Feb. 19, 1901 |
| 981,860 | Jackson | Jan. 17, 1911 |
| 1,546,682 | Slate | July 21, 1925 |
| 1,893,852 | Sullivan | Jan. 10, 1933 |
| 1,912,443 | Goosmann | June 6, 1933 |
| 1,971,106 | Hasche | Aug. 21, 1934 |
| 1,992,486 | Hunt | Feb. 26, 1935 |
| 2,070,098 | Twomey | Feb. 9, 1937 |
| 2,548,499 | Rupp | Apr. 10, 1951 |
| 2,585,288 | Van Nuys | Feb. 12, 1952 |
| 2,641,450 | Garbo | June 9, 1953 |
| 2,687,950 | Kalbach | Aug. 31, 1954 |
| 2,769,852 | Paulson | Nov. 6, 1956 |